Feb. 3, 1925.
J. R. RABIDOU
STONE SAWING MACHINE
Filed Dec. 21, 1922
1,525,323
6 Sheets-Sheet 6
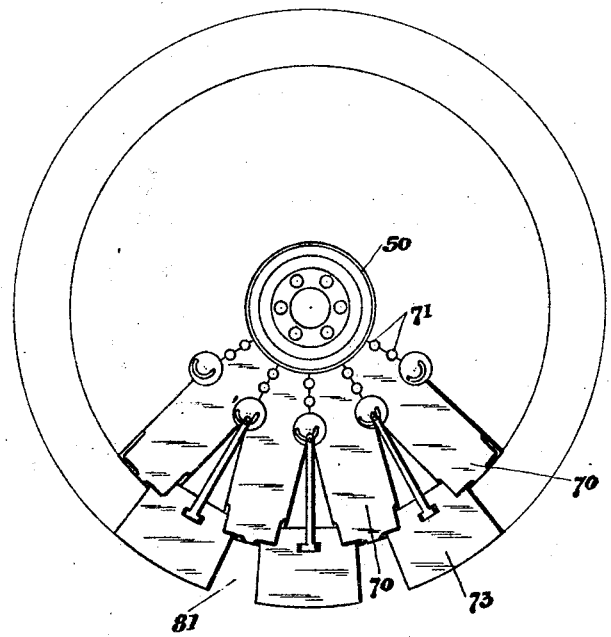
Fig.11.
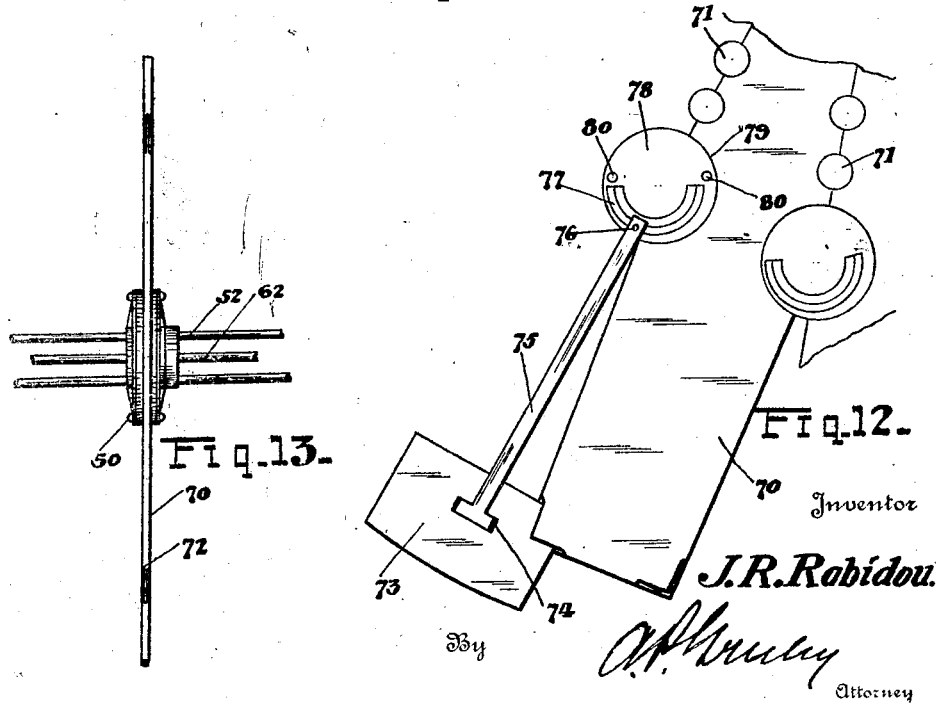
Fig.13.
Fig.12.
Inventor
J. R. Rabidou.
By
Attorney Patented Feb. 3, 1925.

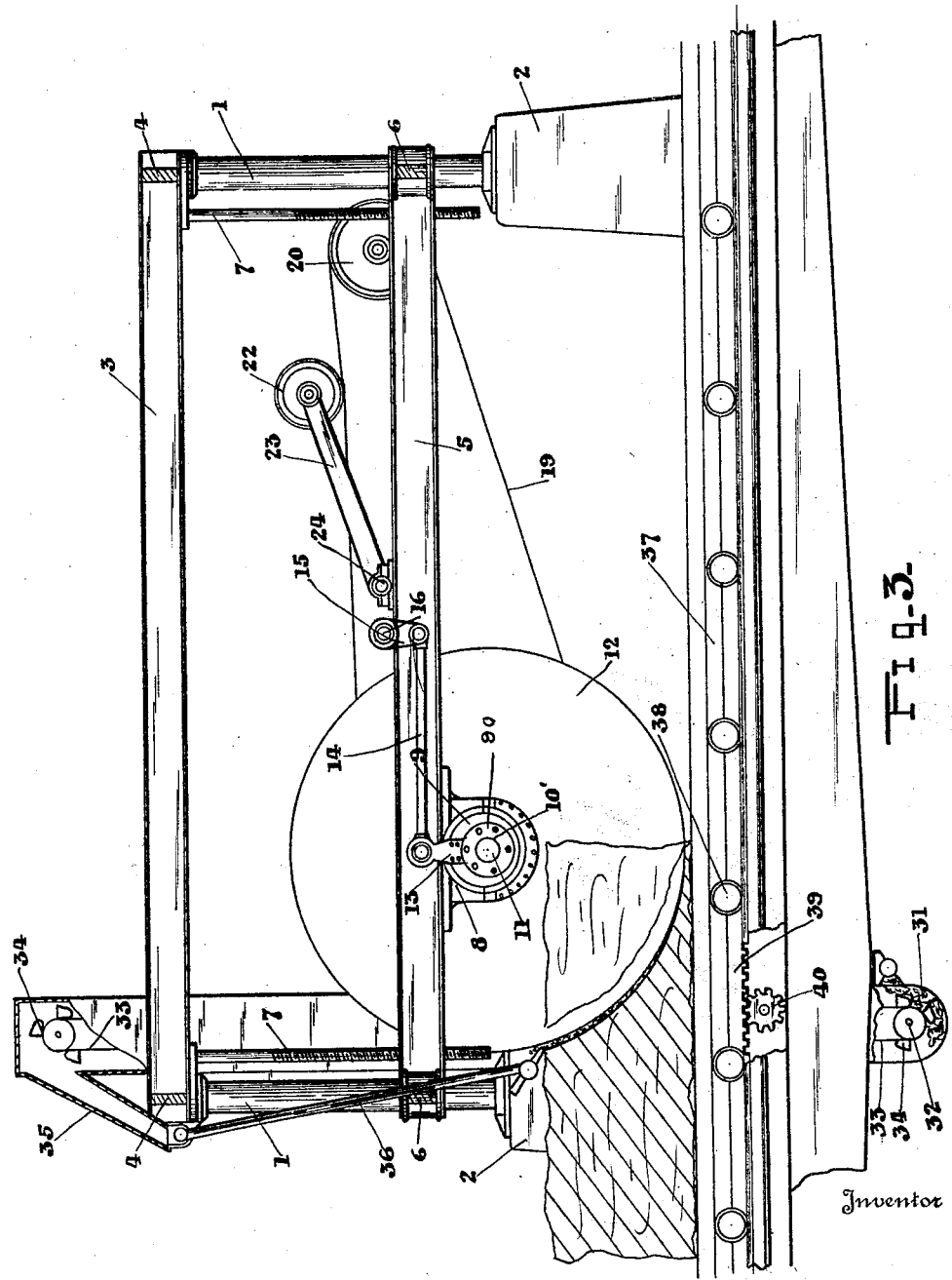

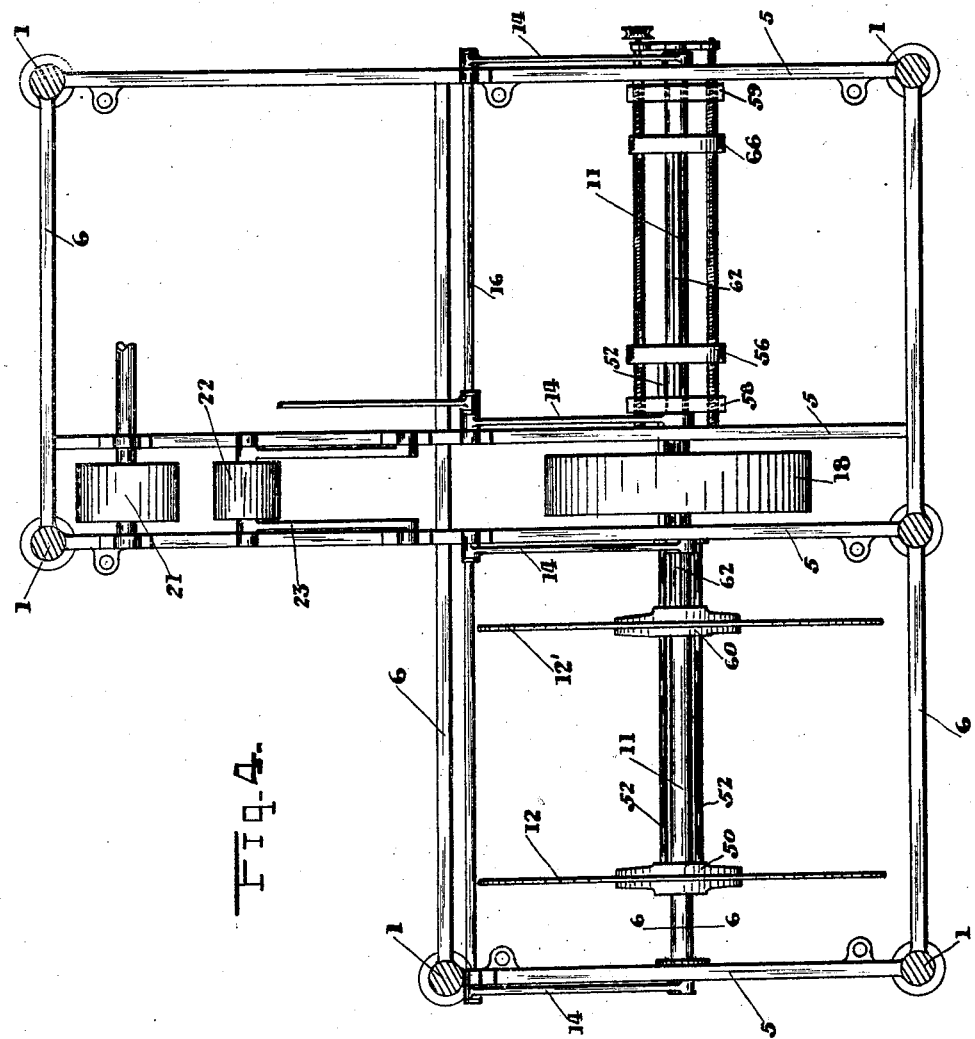

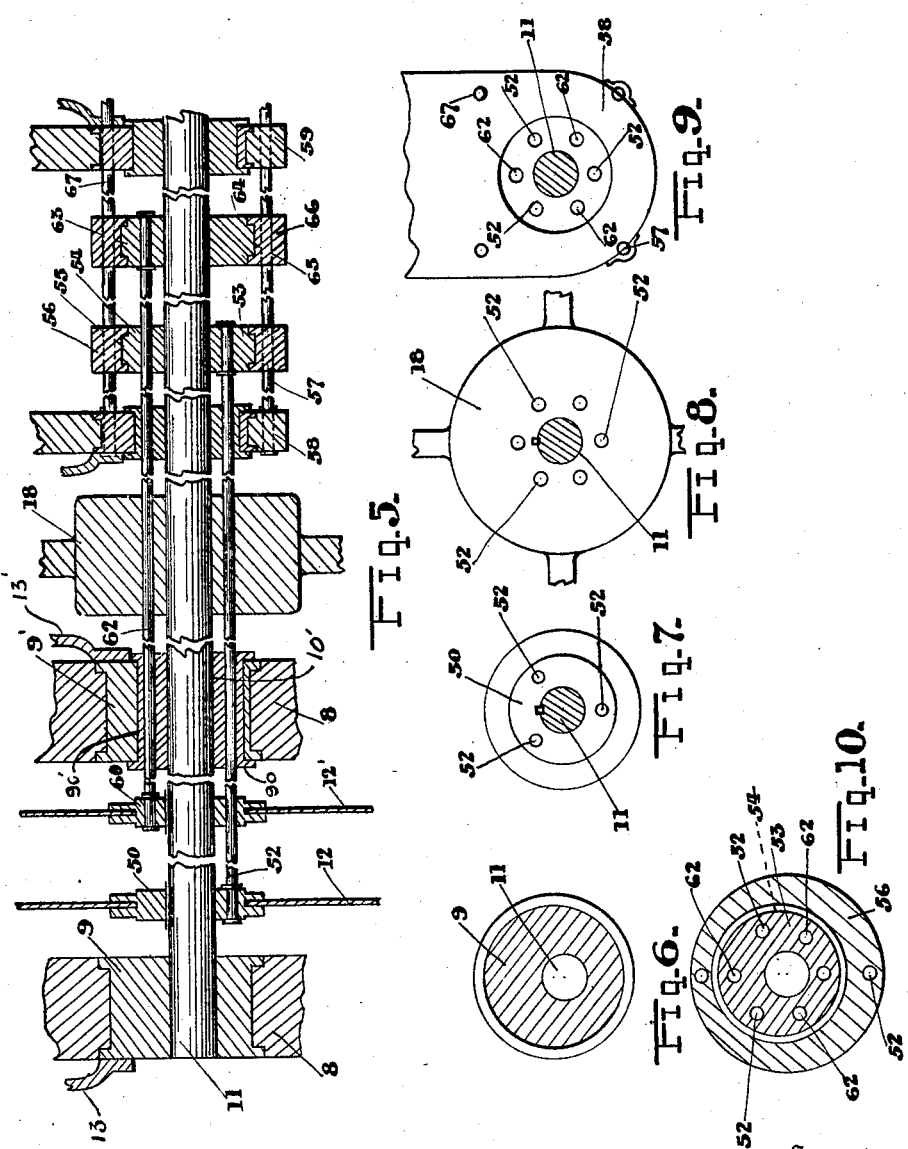

1,525,323

UNITED STATES PATENT OFFICE.

JOSEPH RODRIGUE RABIDOU, OF NORTHFIELD, VERMONT.

STONE-SAWING MACHINE.

Application filed December 21, 1922. Serial No. 608,211.

*To all whom it may concern:*

Be it known that I, JOSEPH RODRIGUE RABIDOU, residing at Northfield, county of Washington, and State of Vermont, and citizen of the United States, have invented certain new and useful Improvements in Stone-Sawing Machines, of which the following is a specification, reference being had to the accompanying drawings, forming a part thereof.

My invention relates to stone sawing machines of the circular saw type in which a rotating disc is caused to force abrading material against the stone in the line of its periphery and by the cutting action of the abrading material to form in the stone, as it is fed to the disc, a cut or kerf corresponding to that formed by a toothed saw in wood.

In the use of stone sawing machines of this type the rapidity of the cutting action depends to a considerable extent on the amount of abrading material which can be introduced between the periphery of the disc or saw and the stone at the end of the kerf. In the machines of this type heretofore in use the distance between the periphery of the disc or saw and the end of the kerf is always the same, the disc or saw being carried by a shaft having fixed bearings, and the stone being fed at a definite speed, and is comparatively slight permitting only a small amount of abrading material to enter. As the cutting action depends largely upon the amount of abrading material forced against the stone the cutting action is necessarily slow.

It is a principal object of my invention to provide for varying the distance between the periphery of the disc or saw and the end of the kerf so as at intervals, to leave a relatively large opening to receive abrading material and to thus permit a relatively large amount of abrading material to be introduced by causing the disc or saw to have an oscillating or reciprocating movement in the direction of the cut as well as rotation on its axis.

A further object of the invention is to provide in a stone sawing machine of the type referred to, means for shifting the disc or saw laterally, that is at right angles to the line of the kerf.

A further object of the invention is to provide in a stone sawing machine of the type referred to in which two or more discs or saws are employed, means for independently shifting the saws in lateral direction.

A further object of the invention is to provide a construction of saw adapted for general use in stone sawing machines and particularly adapted for use where means are provided, as in the machine of my present invention for introducing a relatively large amount of abrading material.

With the objects above indicated and other objects hereinafter described in view, my invention consists in the construction and combination of elements hereinafter described and claimed.

Referring to the drawings:

Figure 3 is a view of the opposite side of the machine from that shown in Figure 1.

Figure 4 is a top plan view of the vertically movable frame carrying the saws.

Figure 5 is a longitudinal vertical sectional view on an enlarged scale of the saw carrying shaft showing the means for adjusting the saws laterally.

Figure 6 is a vertical sectional view of one of the eccentrics taken at right angles to its axis.

Figure 7 is a side view of the hub of one of the saws.

Figure 8 is a side view of the hub of the driving pulley.

Figure 9 is a side view of the left hand one of the fixed heads in which the ends of the screw rods are supported.

Figure 10 is a vertical sectional view of the left hand one of the sliding heads.

Figure 11 is a side view of a preferred construction of saw.

Figure 12 is a detail view on an enlarged scale of a portion of the saw.

Figure 13 is an edge view of a saw.

Figure 1:
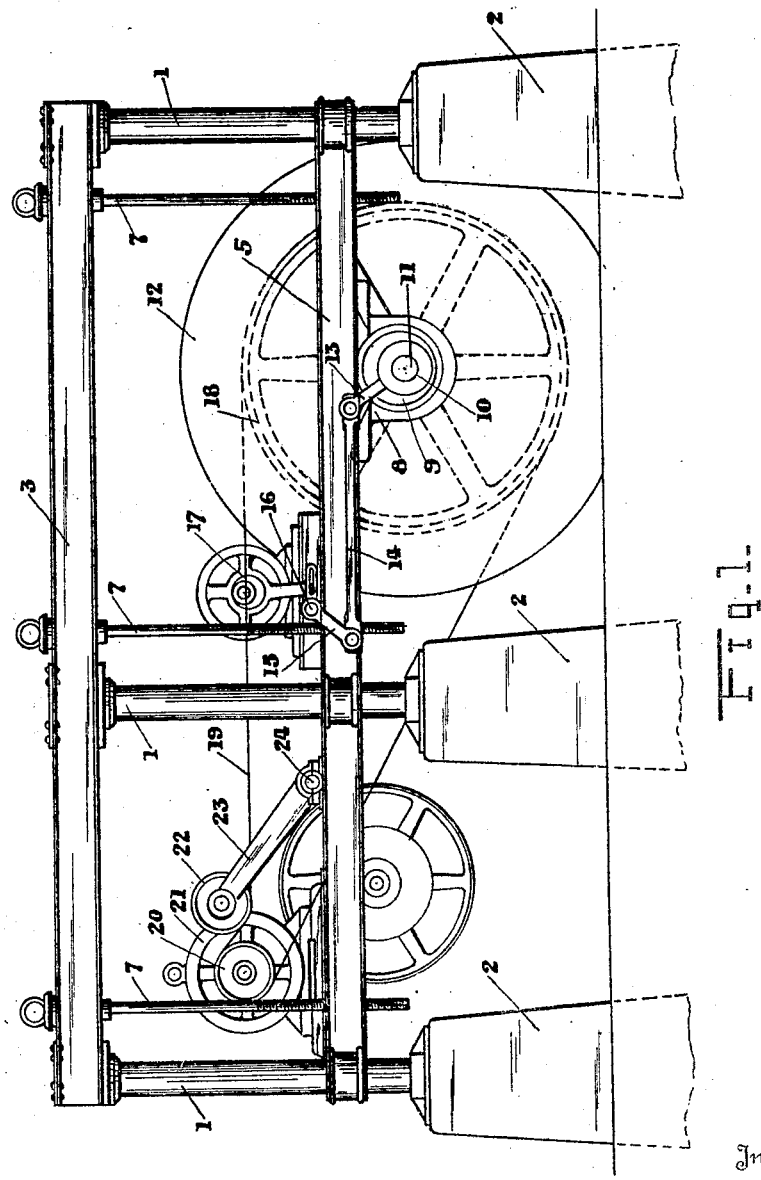
Figure 1 is a side view of a stone sawing machine embodying my invention.

The frame of the machine comprises uprights 1, supported in suitable bases 2, upper longitudinal beams 3 and cross beams 4 rigidly secured together and to the uprights 1, at or near their upper ends, and a lower or saw carrying frame comprising longitudinal beams 5 and cross beams 6 rigidly secured together but arranged to be slidable on the uprights by means of elevating screws 7.

The lower longitudinal beams 5 are provided with bearings 8 and 8' here shown as secured to their under sides in which are carried discs 9 and 9'. The disc 9 has an eccentric opening 10 formed through it in which shaft 11 rotates. Disc 9' has an eccentric opening 90' formed in it in which is mounted a disc 90 having at its center an opening 10' in which the shaft 11 rotates. This shaft 11 carries one or more circular saws 12, 12'.

To the discs 9 and 9' are secured arms 13, 13' to the outer ends of which are pivotally connected operating rods 14, here shown as pivotally connected at their other ends to arms 15 carried by a rock shaft 16 mounted in suitable bearings on the horizontal beams 5 and arranged to be rocked by a motor 17.

On the shaft 11 which carries the saw or saws 12, 12' is a band wheel 18 connected by a belt 19 with a pulley 20 on the shaft of a motor 21 carried on the horizontal beams 5.

An idler 22 carried on the end of arms 23 pivoted at their lower end in bearings 24 on the horizontal beam 5 serves to keep the belt sufficiently tight to effect the driving of the shaft 11 and at the same time permit of the oscillating movement of the shaft.

It will be seen that as the arms 13, 13' are rocked by the action of the operating rods 14 the discs 9, 9' will be oscillated and since the opening 10 of disc 9 for shaft 11, and the opening 90' in which is disc 90 having opening 10' for the shaft 11, are both eccentric, the shaft will be oscillated in the arc of a circle and the periphery of the saw as it advances into the stone will be alternately in contact with the stone at the end of the kerf and away from it.

A pocket is thus formed to receive the abrading material which preferably consists of steel shot. As the shaft carrying the saw, which is, of course rotating and in its rotation carries the abrading material downward, is oscillated in a forward direction the periphery of the saw approaches the end of the kerf tending to close the pocket at its upper end and widening the space toward the lower end of the pocket. Further oscillation in a forward direction brings the periphery of the saw into substantial contact with the end of the kerf at the surface of the stone forcing any abrading material between the periphery of the saw and the end of the kerf against the stone to effect the cutting action.

The wide opening at the upper end of the pocket permits a larger amount of abrading material to enter between the periphery of the saw and the end of the kerf and as this abrading material is carried down it is subjected to increasing pressure of the cutting action.

Figure 2:
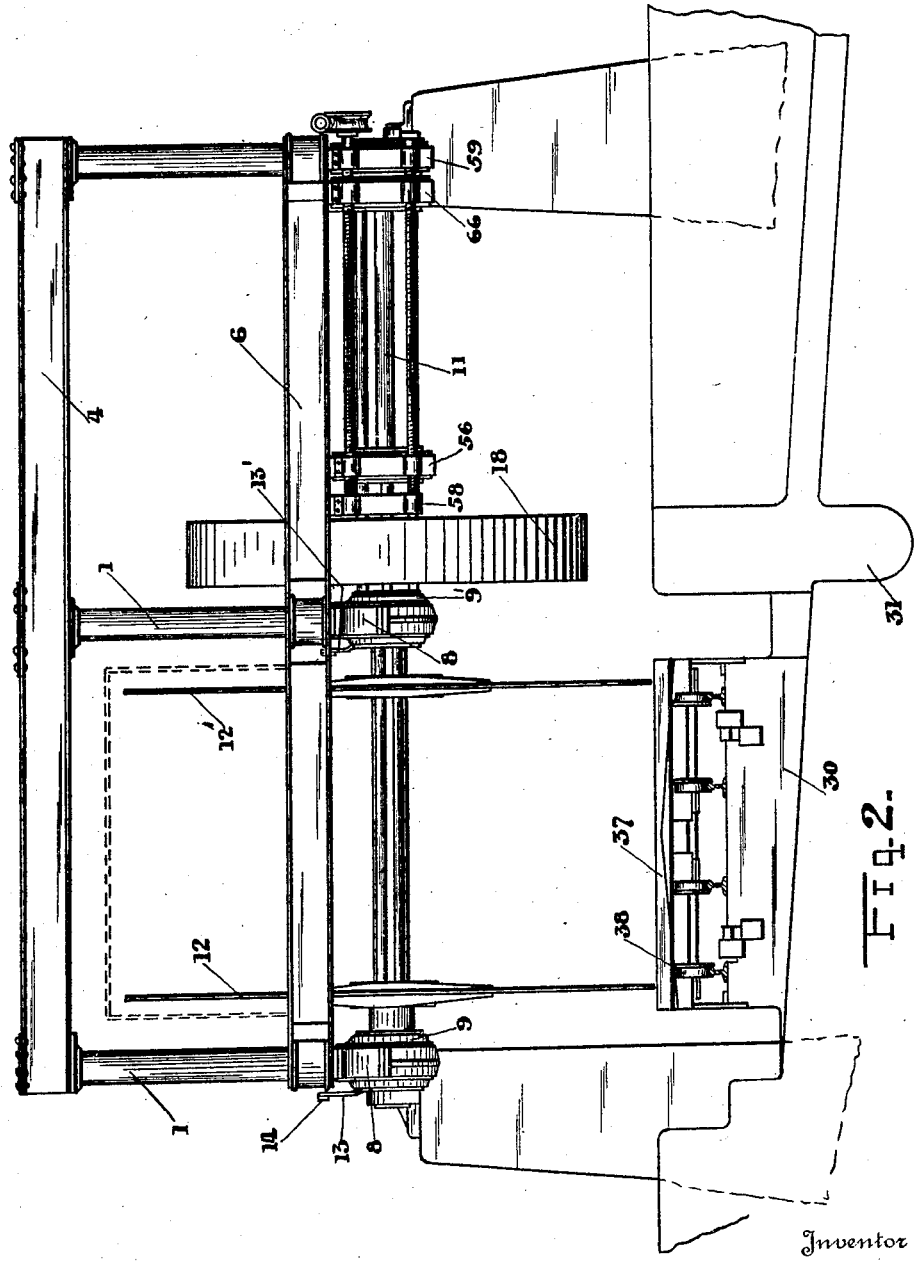
Figure 2 is an end view of the machine shown in Figure 1 looking from the right hand of the machine.

The means for supplying the abrading material forms no part of my present invention. It may be supplied by hand. The means for this purpose may be that shown in Figures 2 and 3 in which the used abrading material falls through the kerf onto an incline 30 by which it is guided to a well 31 in which is located a pulley 32 about which passes the endless belt 33 carrying buckets 34 by which the shot or other abrading material is carried up to the top of the frame and discharged into a chute 35 from which through a tube 36 it is guided to the upper end of the pocket formed as above described between the periphery of the saw and the end of the kerf formed in the stone.

Any usual means may be employed for advancing the stone. The means here shown consists of a carriage 37 movable on rollers 38 and provided with a rack 39 engaged by a gear 40. The means for advancing the stone will, as is usual in machines of this class, be arranged to feed the stone continuously to the saw, that is to say it is not intended to have any oscillating or intermittent action given to the saw.

As thus far described the action has been described with reference to a single saw and without reference to its adjustment at right angles to the line of cut. In the machine shown two saws are employed and means are provided for shifting these saws laterally.

The two saws shown 12 and 12' are provided respectively with hubs 50 and 60 splined to the shaft 11. In the hub 50 are secured the ends of rods 52, preferably three in number. These rods extend through suitable openings in the hub 60 of saw 12', through suitable openings in the disc 90 of the eccentric 9', and through suitable openings in the hub of the driving pulley 18 and through a suitable opening in disc 94 of the eccentric carried by fixed head 58 into a disc 53 having a ring 54 in its periphery which extends into an annular groove 55 forming a bearing for the disc 53. In the sliding head 56 are screwthreaded openings in which are received feed screws 57 having bearings at their ends in fixed heads 58 and 59. On rotating the feed screws the sliding head 56 will be caused to move toward or from the driving pulley 18 and, through the disc 53 and the rods 52, will cause the saw 12 to move with it thus shifting the saw laterally.

The fixed heads 58 and 59 are provided with bearings for eccentrics 9'' and 9''' arranged in line with the eccentrics 9 and 9′ and provided with eccentric bearings for discs 94 and 95 corresponding to discs 90 of eccentrics 9 and 9′. These eccentrics 9″ and 9‴ are provided with arms 13 connected by rods 14 to arms 15 on rock shaft 16. The eccentrics 9, 9′, 9″ and 9‴ are thus oscillated simultaneously.

In the hub 60 of saw 12′ are secured the ends of rods 62 similar to rods 52.

These rods 62 extend through suitable openings in eccentric 9′, through suitable openings in the hub of pulley 18 and through suitable openings in disc 94 of the eccentric carried by fixed head 58 and through suitable openings in disc 53 into disc 63 having ring 64 on its periphery to fit into bearing groove 65 of sliding head 66. This sliding head is provided with screwthreaded openings through which extend feed screws 67 having bearings at their ends in fiixed heads 58 and 59. By rotating these feed screws 67 the sliding head 66 will be moved toward or away from the fixed head 59 and through the rods 62 will shift the saw 12′.

The saws are thus independently adjustable laterally.

While a simple disc of thin metal may be used as the saw it is particularly desirable where, as in the construction described, provision is made for introducing a relatively large amount of abrading material, to so construct the saw that it will be provided on its periphery with pockets adapted to carry the increased quantity of abrading material downward to effect the cutting action. The saw which I prefer to use comprises a series of radial arms 70 secured at their inner ends in the hub 50 having the edges of their inner portions fitting closely together and preferably keyed together by keys 71 and having their outer portions diverging so as to leave a substantial space between their outer ends. In the outer edges of the ends of these radial arms 70 are formed pockets 72 adapted to receive in the pockets of adjacent teeth the inner edges of removable teeth 73. In order to hold these teeth in position they are provided with T head recesses 74 extending inward from their inner edges midway of the length. In these T head recesses are received the T head ends of holding rods 75. The inner ends of these rods 75 are provided with pins 76 which are received in eccentric grooves 77 of discs 78 which are carried in openings 79 of which one half is formed in one of the radial arms 70 and the other in the adjacent radial arm. Pins 80 prevent the discs 78 from rotating when the discs have been turned to the proper position to draw and hold the teeth 73 in the pockets 72.

The space 81 between two adjacent teeth 73 with the end of the radial arms 70 between these two teeth forms a pocket adapted to carry a considerable quantity of abrading material. The wear of the cutting operation comes mainly on the teeth 73 and by loosening the discs 78 and rotating them to relieve the strain on the holding rods 75 the teeth may be readily removed and replaced.

For the purpose of varying the extent of the pocket opened to receive the abrading material when the saw is moved away from the end of the kerf, the extent of the oscillation of the eccentrics may be varied by adjusting the throw given to the rods 14. Any convenient means may be used for this purpose as for instance, as shown in Figure 1 the arm through which the rock shaft 16 is operated may be provided with a slot 16′ in which the pivot of the operating arm carried by the motor 17 may be adjusted.

While in the construction shown the stone is fed to the saw it should be understood that, if desired the stone may be stationary and the frame carrying the saws may be advanced as the saw cuts into the stone. Whether the stone is fed to the saw or the saw is advanced relative to the stone, the movement should be at a constant rate though, of course this rate may be more or less rapid according to the rapidity with which the cutting is effected, depending on the character and thickness of the stone, the size and speed of rotation of the saw or other circumstances.

It will, of course be understood that the mechanism for shifting the saw or saws laterally may be omitted.

It should also be understood that I do not desire to be limited to the particular construction or arrangement shown and described as it is obvious that many changes in the particular construction and arrangement may be changed without departing from the spirit of my invention.

Having thus described my invention what I claim is:—

1. In a stone sawing machine, a support for the stone to be sawed, a rotating saw, a shaft carrying the saw, means for giving the stone and the saw rotation movement at a constant rate, and power driven means arranged to operate during the sawing operation for intermittingly moving the shaft carrying the saw in a direction at right angles to the axis of the shaft to vary the distance between the periphery of the saw and the end of the kerf cut by it.

2. In a stone sawing machine, a support for the stone to be sawed, a rotating saw, means for giving the stone and the saw relative movement at a constant rate, and power driven means adapted for continuous operation for oscillating the saw in a direction at right angles to its axis of rotation to intermittingly vary the distance between the periphery of the saw and the end of the kerf cut by it.

3. In a stone sawing machine, a support for the stone to be sawed, a rotating saw, means for giving the stone and the saw relative movement at a constant rate, power driven means adapted for continuous operation for oscillating the saw in a direction at right angles to its axis of rotation to intermittingly vary the distance between the periphery of the saw and the end of the kerf cut by it, and means for varying the extent of the oscillations given to the saw.

4. In a stone sawing machine, a support for the stone to be sawed, a rotating saw, means for giving the stone and the saw relative movement at a constant rate, power driven means adapted for continuous operation for intermittingly varying the distance between the periphery of the saw and the end of the kerf cut by it, and means for supplying abrading material to the space between the periphery of the saw and the end of the kerf.

5. In a stone sawing machine, a support for the stone to be sawed, a shaft carrying a circular saw and mounted in bearings movable in a direction at right angles to the axis of rotation of the shaft, means for giving the stone and the saw relative movement at a constant rate, and power driven means adapted for continuous operation for reciprocating the bearings of the shaft to intermittingly vary the distance between the periphery of the saw and the end of the kerf cut by it.

6. In a stone sawing machine, a support for the stone to be sawed, a shaft carrying a circular saw and mounted in bearings movable in a direction at right angles to the axis of rotation of the shaft, means for giving the stone and the saw relative movement at a constant rate, and adjustable power driven means adapted for continuous operation for reciprocating the bearings of the shaft to intermittingly vary the distance between the periphery of the saw and the end of the kerf cut by it.

7. In a stone sawing machine, a support for the stone to be sawed, a shaft carrying a circular saw and mounted in bearings movable in a direction at right angles to the axis of rotation of the shaft, means for feeding the stone to the saw at a constant rate, and power driven means adapted for continuous operation for reciprocating the bearings of the shaft to intermittingly vary the distance between the periphery of the saw and the end of the kerf cut by it.

8. In a stone sawing machine, a support for the stone to be sawed, a shaft carrying a circular saw and having bearings on opposite sides of the saw arranged in rotatable discs, means for giving the stone and the saw rotative movement at a constant rate, and means for simultaneously oscillating the discs carrying the bearings of the shaft to move the saw intermittingly during the sawing operation in a direction at right angles to the axis of the shaft to vary the distance between the periphery of the saw and the end of the kerf cut by it.

9. In a stone sawing machine, a support for the stone to be sawed, a shaft carrying a circular saw, and means for shifting the saw longitudinally of the shaft comprising rods extending longitudinally of the shaft and rotating therewith, and means for moving the rods.

10. In a stone sawing machine, a support for the stone to be sawed, a shaft carrying a circular saw, and means for shifting the saw longitudinally of the shaft comprising rods extending longitudinally of the shaft secured at one end in the hub of the saw and secured at the other end in a disc arranged to rotate with the shaft and carried in bearings movable longitudinally of the shaft.

11. In a stone sawing machine, a support for the stone to be sawed, a shaft carrying a plurality of circular saws, and means for shifting each of the saws longitudinally of the shaft independently of the other comprising rods extending longitudinally of the shaft and rotating therewith, and means for moving the rods.

12. In a stone sawing machine, a support for the stone to be sawed, a shaft carrying a plurality of circular saws, and means for shifting each of the saws longitudinally of the shaft independently of the other comprising rods extending longitudinally of the shaft secured at one end in the hub of one of the saws and secured at the other end in a disc arranged to rotate with the shaft and carried in bearings movable longitudinally of the shaft, rods extending longitudinally of the shaft secured at one end in the hub of another of the saws and secured at the other end in a second disc carried in bearings movable longitudinally of the shaft, and means for independently shifting the discs longitudinally of the shaft.

13. In a stone sawing machine, a support for the stone to be sawed, a shaft carrying a circular saw having its bearings in discs mounted eccentrically in rotary discs, means for shifting the saw longitudinally of the shaft comprising rods extending longitudinally of the shaft secured at one end in the hub of the saw and secured at the other end in discs mounted eccentrically in rotary discs and arranged to rotate with the shaft, said rotary discs being carried in bearings movable longitudinally of the shaft, and means for oscillating the rotary discs simultaneously.

14. In a stone sawing machine, a support for the stone, a shaft, a circular saw carried by the shaft adapted to cut a relatively narrow kerf in the stone and provided on its periphery with pockets adapted to receive abrading material, power operated means for oscillating the shaft in a direction at right angles to its axis to intermittingly vary the distance between the periphery of the saw and the end of the kerf cut by it to vary the quantity of abrading material permitted to enter and to subject abrading material entering the pocket to increasing pressure as it is carried down into the kerf.

In testimony whereof I hereunto affix my signature.

JOSEPH RODRIGUE RABIDOU.

In the presence of—
GELSIE MONTI,
DORIS H. WHITE.